United States Patent [19]

Waldron

[11] 4,212,011
[45] Jul. 8, 1980

[54] MULTIMODE LIQUID CRYSTAL DISPLAY

[75] Inventor: Wesley K. Waldron, Scotia, N.Y.

[73] Assignee: General Electric Company, Schenectady, N.Y.

[21] Appl. No.: 937,953

[22] Filed: Aug. 30, 1978

[51] Int. Cl.² ............................ G06F 3/14; G09F 9/32
[52] U.S. Cl. ........................................ 340/784; 340/805
[58] Field of Search ................ 350/332; 340/805, 765, 340/784

[56] References Cited

U.S. PATENT DOCUMENTS

| | | | |
|---|---|---|---|
| 3,961,840 | 6/1976 | Morokawa | 340/805 |
| 4,079,369 | 3/1978 | Fukumoto | 350/332 |

*Primary Examiner*—Marshall M. Curtis
*Attorney, Agent, or Firm*—Geoffrey H. Krauss; James C. Davis; Marvin Snyder

[57] ABSTRACT

A liquid crystal display includes a pair of electrodes separated by the liquid crystal layer, with at least one of the electrodes fashioned of a background portion and N segmented portions. Each segment is selectively energizable with a first waveform, having the same frequency, but a different phase, relative to the waveform energizing the background areas of the same electrode. The remaining electrode is selectively driven by one of a multiplicity of phase-shifted waveforms of the same frequency, to facilitate the display of characters, symbols and other indicia in one of $2^{N+1}$ display states.

9 Claims, 9 Drawing Figures

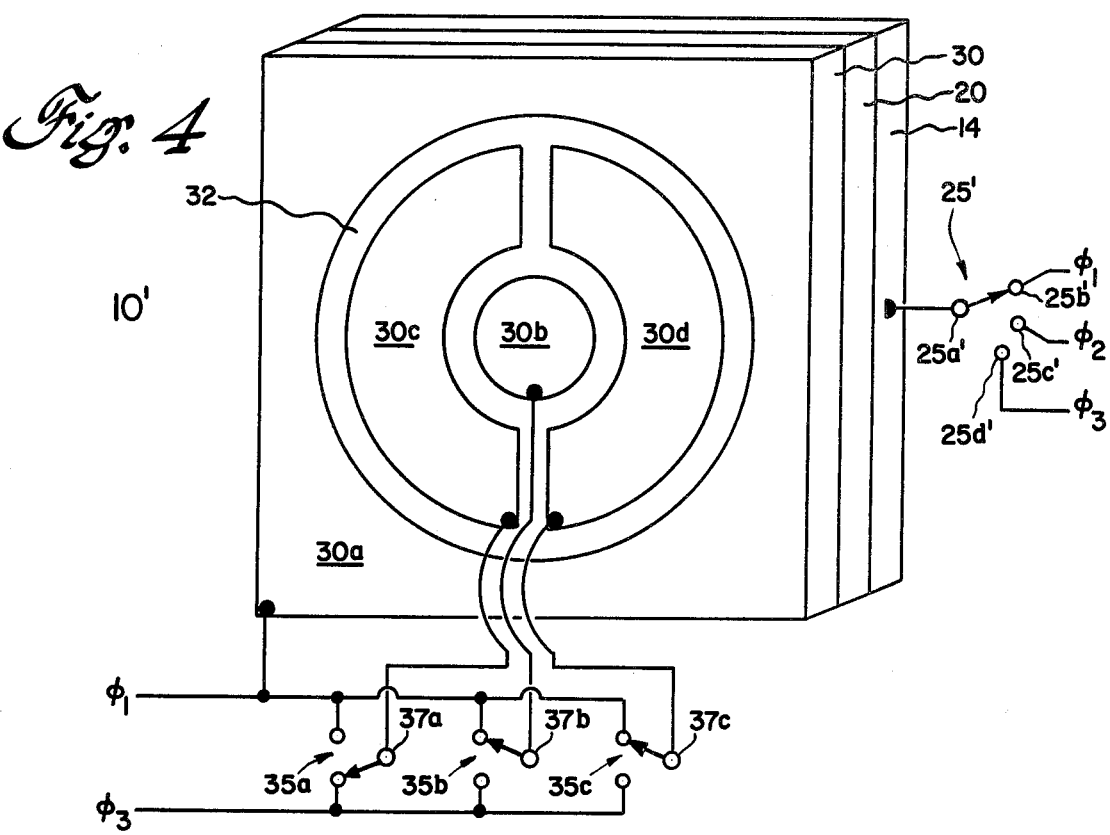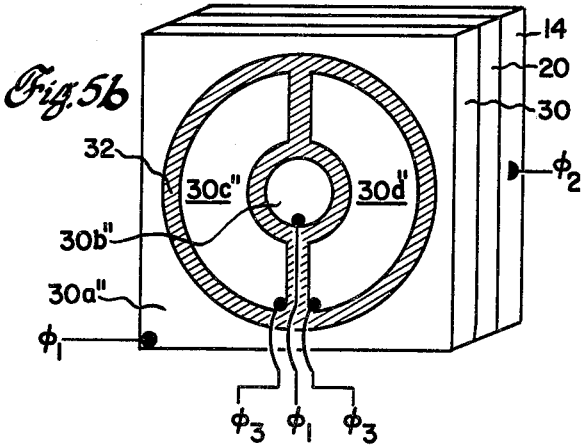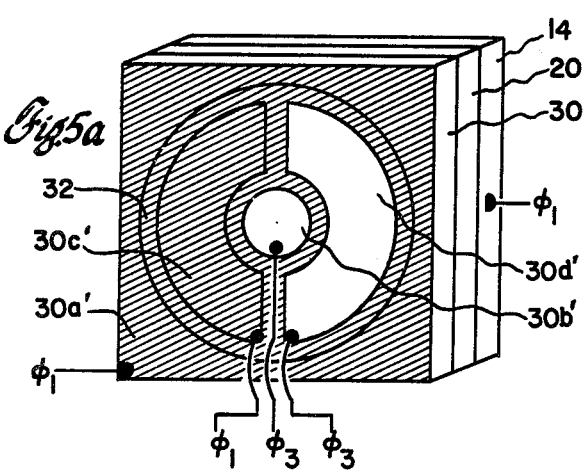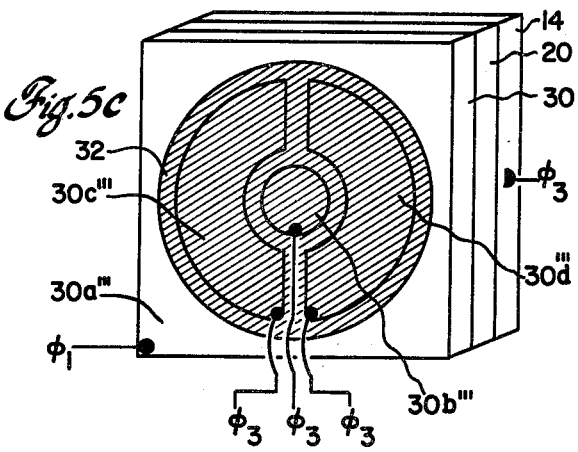

MULTIMODE LIQUID CRYSTAL DISPLAY

BACKGROUND OF THE INVENTION

The present invention relates to information displays and, more particularly, to a novel liquid crystal display having a multiplicity of selectable information display states.

Many technologies are presently utilized in information display apparatus; liquid crystal displays are particularly advantageous for low power consumption operation. In the conventional liquid crystal display, indicia-forming areas are either light-absorptive or light-transmissive, whereby essentially only two display conditions are realized. It is desirable to provide a liquid crystal display, with all the attendant advantages thereof, but having a plurality of indicia-indicating conditions, whereby a multiplicity of operating states are facilitated.

BRIEF SUMMARY OF THE INVENTION

In accordance with the invention, a novel multimode liquid crystal display includes at least one liquid crystal display cell having a liquid crystal layer bounded by a continuous control electrode abutting one surface thereof and by a second electrode abutting the remaining surface thereof, with the second electrode having a background electrode portion at least adjacent to at least one segment electrode portion. The segment portions are so positioned as to form symbols, characters and other indicia in selectable manner. The control electrode is selectively coupled to one of a plurality of periodic driving voltage signals, all having the same frequency and waveshape but being shifted in phase relative each to the other. The background areas of the remaining electrode are continuously driven with one of the waveforms available for selectively driving the control electrode, while the N (where N is an integer greater than zero) segment areas of the remaining electrode are continuously driven with a waveform having the same amplitude, waveshape and frequency as the waveform driving the background areas of the remaining electrode, but differing in phase therefrom, preferably by 180 degrees. Dependent upon the phase of the waveform selectively driving the control electrode, relative to the phase of the identical frequency waveform driving the background areas of the remaining electrode, various combinations of the segmented and background areas of the display may be selectively placed in one light-transmissive condition, e.g., allowing transmission of light therethrough, with the area between segment and background portions of the remaining electrode remaining in the other light-transmissive, e.g., light-absorptive, condition at all times.

Each driving waveform has a waveshape such that the instantaneous value thereof is essentially equal to the instantaneous value of each other driving voltage waveform, when compared on an in-phase basis. The matching of waveforms is such that a net resulting DC voltage of essentially zero amplitude results while the RMS value is less than the threshold voltage required to excite the liquid crystal cell. Further, the change in light-transmission condition within any portion of the liquid crystal layer is facilitated by phase-shifting the waveform applied to one electrode area bounding that portion of the cell, relative to the waveform applied to the other electrode area also defining the associated cell portion. Thus, the phase between a pair of driving voltage waveforms is varied from a net RMS voltage of amplitude less than the threshold voltage of the liquid crystal material to an RMS voltage of amplitude greater than the threshold voltage, to vary the associated cell portion from one to the other of the light-transmissive and light-absorptive conditions, by means of the phase difference between the driving voltages. Typically, the driving waveforms are of unipolar nature and with duty factors less than 100%.

In one preferred embodiment, wherein the background areas of the remaining electrode are driven by a square wave at a first frequency and a first phase, and the segment areas of the remaining electrode are driven by a square wave of similar amplitude and frequency, but shifted by 180 degrees in phase relative to the waveform driving in background areas of the remaining electrode, the control electrode drive voltage is selectable among one of three square waveforms having the same amplitude and frequency as the waveforms driving areas of the remaining electrode, and having phases, relative to the phase of the square wave driving the background area of the remaining electrode, of 0 degrees, 90 degrees and 180 degrees. Selecting the waveform having a 0 degree phase for driving the control electrode causes the background and border areas of the cell to be light-absorptive, while the segment areas are light-transmissive for a first mode of operation; driving the control electrode with the waveform having a phase of 180 degrees relative to the phase of the waveform driving the background areas of the remaining electrode, causes the segment and border areas to be placed in a light-absorptive condition, with the background areas in the light-transmissive condition, for a second mode of operation; and driving the control electrode with a waveform having a phase 90 degrees relative to the phase of waveform driving the background areas of the remaining electrode, causes the border area around the segments to be in a light-absorptive condition, with both the segment and background areas of the remaining electrode to be placed in the light-transmissive condition, whereby a third mode of operation is enabled. Removal of all voltage from the control electrode, or driving of all electrodes by in-phase waveforms of essentially identical waveshape, provides a completely light-absorptive (dark) display, facilitating a fourth display mode.

In another preferred embodiment, a plurality N of segmented electrode areas are present in addition to the background electrode, and are selectively energized by one of a pair of waveforms of identical frequency and amplitude, but of opposite phase, whereby, with the control electrode driven by one or the other of the pair of waveforms, a total of $2^{N+1}$ different display states (modes) are realizable from a single display cell.

Accordingly, it is an object of the present invention to provide a novel liquid crystal display capable of displaying data in a multiplicity of modes.

This and other objects of the present invention will become apparent upon consideration of the following detailed description, taken in conjunction with the drawings.

BRIEF DESCRIPTION OF THE DRAWINGS

FIG. 4 is a perspective view of a display cell having a multi-segmented electrode; and FIGS. 5a–5c are perspective views of the cell of FIG. 4 under various excitation conditions and illustrating the multiplicity of display modes thereof.

DETAILED DESCRIPTION OF THE INVENTION

Figure 1:
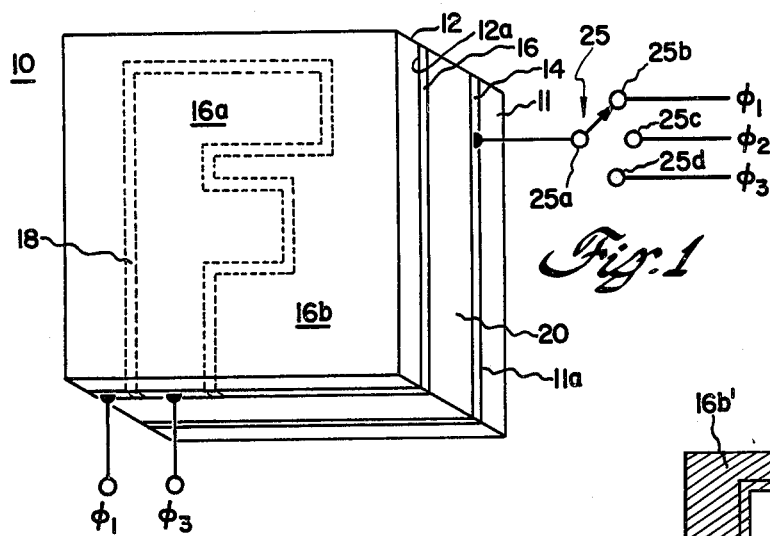
FIG. 1 is a perspective view of a liquid crystal display cell in accordance with the principles of the invention.
Figure 2:
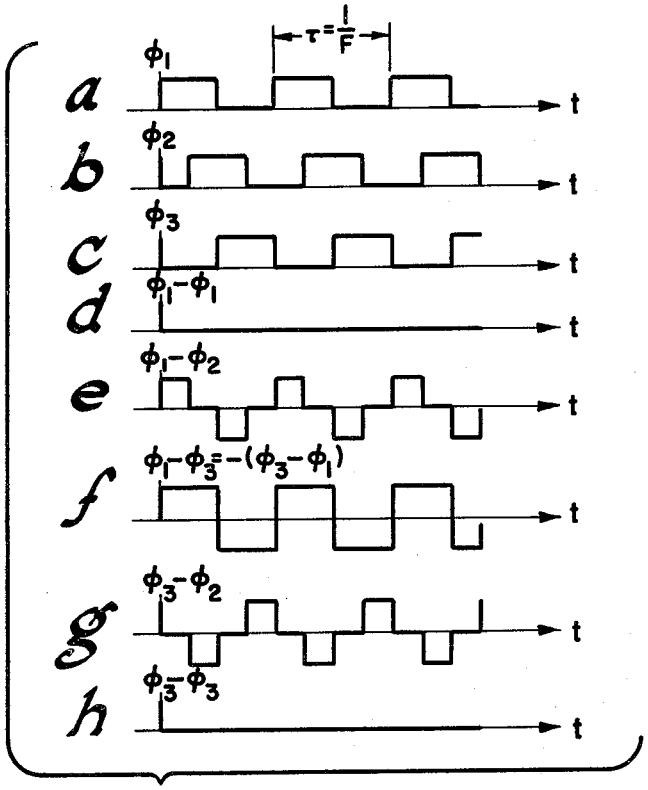
FIG. 2 is a set of coordinated graphs of driving and resulting signal relationships in the multimode liquid crystal display, and useful in understanding the principles of operation thereof.
Figure 3A:
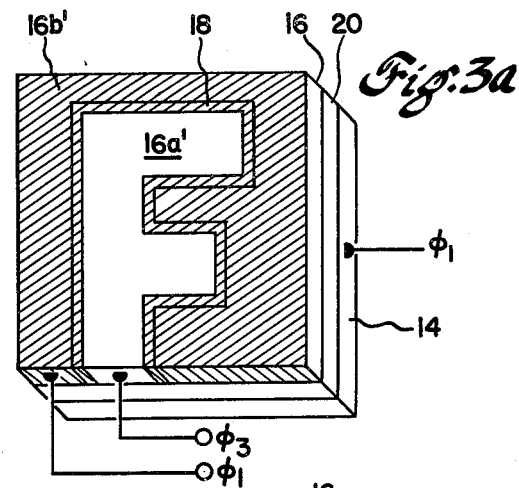
FIGS. 3a, 3b and 3c are perspective views of the singlesegment cell for various control electrode excitation conditions and illustrate three of four possible operational modes.
Figure 3B:
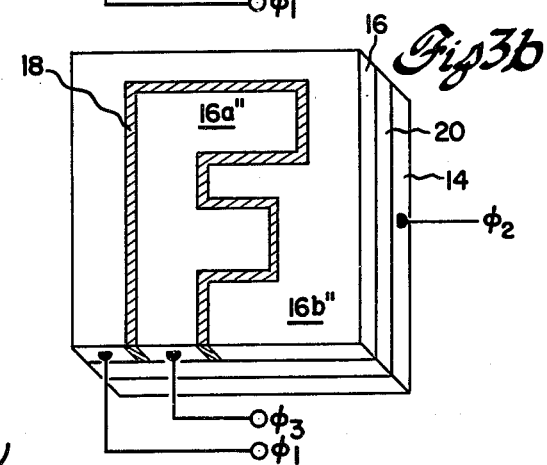
Figure 3C:
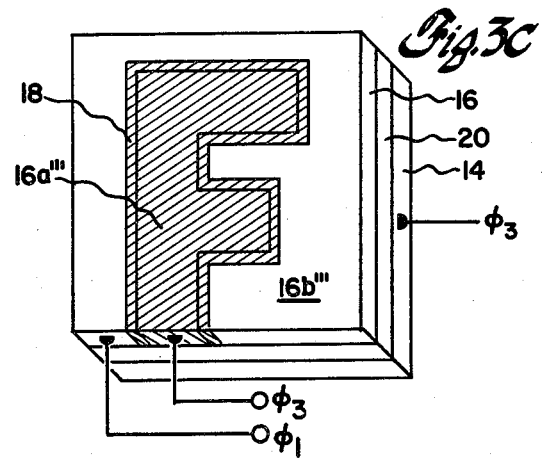

Referring initially to FIGS. 1, 2 and 3a–3c, a multi-mode liquid crystal display cell 10 includes a pair of spaced-apart and substantially parallel substrates 11 and 12. Dependent upon the display technology selected, e.g. reflective or transmissive, one or both substrates may be formed of light transparent material. A transmissive cell is assumed herein for purposes of illustration; it should be understood that other known forms of liquid crystal display cells may be equally as well utilized with the addition of known elements, e.g. reflectors, polarizers, guest dichroic dyes, and the like.

A conductive, substantially continuous, planar control electrode 14 is fabricated upon the interior surface 11a of rear substrate 11. An electrode 16 of substantially transparent, conductive material, such as tin oxide and the like, is fabricated upon the planar interior surface 12a of the forward substrate 12, and has appropriate continuous channels 18 etched therethrough to separate a sector electrode are a 16a from the remaining background electrode area 16b. A quantity of liquid crystal material 20 fills the volume between the facing, spaced-apart electrodes 14 and 16, and is retained therebetween by suitable gasket means (not shown). Cell 10 may be one of a linear or two-dimensional array of similar cells each having segmented electrodes of similar or different shape, size and other distinguishing features; the various electrodes of each of a plurality of cells in an array may be connected together or may be physically separated each from the other, in accordance with the array display characteristics to be achieved.

In the illustrated, presently preferred single-cell embodiment, the continuous control electrode 14 is electrically connected to the common point 25a of a single pole-three throw switch means 25. The three switchable contact positions 25b, 25c and 25d are respectively driven by suitable circuitry, such as Johnson counters, phase shifters, and the like, known to the art, for providing unipolar signals of a common frequency and waveshape but having relative phase differences therebetween. Illustratively, the waveform available at switch contact 25b has a first phase $\phi_1$, e.g. a waveform (FIG. 2, waveform (a) with a relative phase of 0 degrees with respect to an arbitrary reference; another waveform (FIG. 2, waveform (b) available at switch contact 25c, is of similar frequency and waveshape, but has a second phase $\phi_2$, different from phase $\phi_1$, e.g. $\phi_2$ is 90 degrees relative to $\phi_1$; and the waveform at switch contact 25d is a third signal (FIG. 2, waveform (c) of frequency and wave shape similar to the signals available at switch contacts 25b and 25c, but has another phase $\phi_3$ different from both $\phi_1$ and $\phi_2$, e.g. $\phi_3$ has a phase of 180 degrees relative to $\phi_1$.

Segment electrode portion 16a is continuously driven, during display operation, by the waveform having phase $\phi_3$, while background electrode portion 16b is continuously driven by the waveform having phase $\phi_1$.

The light-absorptive and light-transmissive quality of the areas defined by segment electrode 16a and background electrode 16b will be dependent upon the A.C. voltage between electrode portions 16a and 16b, respectively, and the control electrode; thus, the response of individual areas of the cell is established by the phase $\phi_1$ or $\phi_3$ of the associated segment or background driving voltage, and the phase of the waveform coupled to control electrode 14, whereby, for the illustrative single cell, four modes of indicia definition are available. In the illustrated embodiments, it is assumed that the cell is so constructed that an area of the liquid crystal material is light absorptive when an A.C. voltage of RMS value less than some known threshold voltage is applied across that liquid crystal area, and that the area is light-transmissive when an A.C. voltage of RMS value greater than the threshold voltage is applied across that area. It should be understood that the opposite set of light-absorption and transmission conditions will be equally usable.

The instantaneous A.C. voltage across portions of the cell adjacent the background electrode portion of 16b, is established by the phase difference between the driving voltage having phase $\phi_1$ and the driving voltage coupled to rear electrode 14. With a square-wave driving signal having phase $\phi_1$ and a frequency F, applied to background electrode portion 16b, and with switch means 25 positioned to connect common point 25a to first contact 25b, whereby a square-waveform of the same frequency F and the same relative phase $\phi_1$ is coupled to rear electrode 14, the resulting voltage across the cell is given by the relative difference in phases, i.e., $\phi_1 - \phi_1 = 0$ (FIG. 2, waveform (d) and the portion of the liquid crystal display cell defined by background electrode portion 16b' (FIG. 3a) is in the light-absorptive, or "dark", condition, as is the "border" portion of the cell defined by non-electrode-bearing groove 18. The voltage across the liquid crystal material in areas adjacent to segment electrode portion 16a, driven by a waveform of phase $\phi_3$, 180 degrees out of phase relative to the phase $\phi_1$ of the identical-waveshape waveform driving rear electrode 14 causes a bipolar, squarewave of non-zero amplitude (waveform f of FIG. 2) to be present, whereby the display cell area defined by segment electrode portion 16a' (FIG. 3a) is in the light-transmissive condition (assuming that the cell is of the transmissive type, and that the amplitudes of the waveforms having $\phi_1$, $\phi_2$ and $\phi_3$ are established to be of sufficient magnitude to switch the liquid crystal material from the light-absorptive state to light-transmissive state when a non-zero voltage is present across the cell). Thus, energizing the back electrode 14 with the $\phi_1$ waveform provides a bright segment area 16a' and a dark background area 16b' and a dark separation area beneath groove 18.

If switch means 25 is set to couple a waveform having phase $\phi_2$, 90 degrees out of phase with $\phi_1$, to rear electrode 14 (FIG. 3b) the voltage across areas of the cell defined by the background electrode portion 16b'' is of a non-zero magnitude (waveform e of FIG. 2) whereby a light-transmissive background portion is established. Similarly, the relative phase difference between the waveform, with phase $\phi_3$, driving the segment electrode portion 16a'', and the phase $\phi_2$ of the waveform driving the back electrode 14, causes a non-zero voltage to be applied and renders the area of the cell defined by segment electrode portions 16a'' in the light-reflective state. As the border area of the liquid crystal material defined by groove 18 cannot have a voltage thereacross, this area remains in the light-absorptive state, whereby the display cell has a bright background, bright segment and dark area therebetween to define bright indicia upon a bright background.

Coupling the third identical-waveshape waveform, with phase $\phi_3$, to rear electrode 14, causes the control electrode waveform to be of identical phase with the driving voltage coupled to the segment electrode portion 16a''' (FIG. 3c), whereby the signal electrode portion and the groove area 18 are both in the light absorptive condition. As background electrode portion 16b''' is driven by a waveform of phase $\phi_1$, of phase different from the phase $\phi_3$ driving rear electrode 14, a non-zero amplitude waveform (waveform f of FIG. 2) is applied and background area 16b''' is in the light-transmissive condition. Therefore, a dark indicia is formed upon a bright background.

If an additional contact is added to switch means 25, whereby an open circuit is coupled to the control electrode, a resulting voltage cannot appear across either the segment or background portions of the cell if the phase of the waveforms driving electrode portions 16a and 16b are essentially equal. In this case, the entire cell is in the light-absorptive condition and appears entirely dark. Thus, four different and distinct, information indicating states are facilitated for the single segment cell.

It should be understood that the use of excitation voltages of selectable phase allows a single display cell to form a multiplicity of different indicia, with the total number of possible display states of a single cell being equal to $2^{N+1}$, where N is the number of segment electrode portions of one of the pair of cell electrodes, which electrode also includes a background electrode portion, and with the remaining electrode being the control electrode.

Alternatively, the background electrode portion (which need not surround the segment electrode portions) may be considered as another segment electrode, with a drive voltage of constant phase, whereby each of N+1 segments can be either in the transmissive or absorptive condition, for a total of $2^{N+1}$ states of the display.

Considering now FIGS. 4 and 5a–5c, a single multimode liquid crystal display cell 10' has, in sequential order between its front and rear transparent substrates (not shown for purpose of simplicity) a first, forward electrode 30 having a continuous groove 32 formed therein of shape sufficient to form a background portion 30a of the electrode and three segment portions of the electrode, e.g. a central portion 30b and two arcuate portions 30c and 30d, respectively, each separated from the other and from background portion 30a by the nonconductive material in channl 32. It should be understood that the channel may be formed by etching the desired shape into the conductive coating forming electrode 30 and that the groove may be subsequently filled either by the liquid crystal material 20 or may be filled with any suitable nonconductive material impervious to attack by the liquid crystal material of layer 20.

The single, continuous, planar control electrode 14 is parallel to and spaced from planar front electrode 30, with the layer 20 of liquid crystal material therebetween. Control electrode 14 is connected to the common terminal 25a' of a single-pole, three-position switch means 25'. It should be understood that switch means 25' may be mechanical, electromechanical or electronic in nature. The selectable switch contacts 25b' 25c' and 25d' have available thereat the respective waveforms of identical frquency, amplitude, and waveshape but of differing phase, as previously described with reference to FIG. 2, waveforms a, b, and c. The waveform having the first phase $\phi_1$, e.g. a phase of 0° relative to an arbitrary reference, is coupled to front electrode background portion 30a, as well as to one selectable contact of each of a multiplicity N of single-pole, two-position switch means; in the illustrating embodiment, wherein the number N of segment electrode portions is three, a total N=3 switch means 35a, 35b and 35c are utilized. The contacts 37a, 37b and 37c of respective switch means 35a, 35b and 35c, are respectively connected to segment electrode portions 30c, 30b and 30d. The remaining selectable contact of each of the three switch means is energized with the waveform having a phase opposite to the waveform energizing the first selectable switch contact, e.g. the waveform with phase $\phi_3$ is permanently connected to each of the lower switch contacts of switch means 35a, 35b and 35c.

In operation, the area defined by nonconductive groove 32 remains in the light-absorbing condition, whereby that area is "dark," regardless of the position of switch means 25' and the excitation upon control electrode 14. The light-absorbing or light-transmitting condition of the background area defined by background electrode portion 30a or the sectors defined by electrode portions 30b, 30c and 30d, is determined by the relative phasing between the driving waveforms impressed thereon relative to the driving waveform impressed upon control electrode 14, at a particular instant.

If switch means 25' couples the driving waveform with phase $\phi_1$ to control electrode 14 (FIG. 5a), then the background electrode portion 30a' is in the lightabsorptive condition, due to the driving waveform of phase $\phi_1$ being also coupled thereto, whereby the voltage across the liquid crystal layer underlying the background electrode portion is zero. The light-absorptive or light-transmissive condition of each of the three segment electrode portions is determined by the position of the associated switch means: if the associated switch means is positioned to couple a driving waveform with phase $\phi_1$ to the associated segment electrode portion, a voltage of substantially zero magnitude appears across that portion of the liquid crystal material and the particular segment appears in the light-absorptive condition, as illustrated by the left arcuate segment electrode portion 30c' being driven by the $\phi_1$ waveform; if a waveform of opposite phase, i.e. phase $\phi_3$, is coupled to a segment electrode portion, then a non-zero voltage is impressed across the liquid crystal material thereunder and renders that portion in the light-transmissive condition, as seen by the application of the $\phi_3$ waveform to circular central electrode 30b' and right arcuate electrode 30d', whereby the circular and right arcuate areas are in the light-transmissive conditions. It will be seen that with the $\phi_1$ waveform coupled to control electrode 14, a total of eight different indicia-indicating states, each with a "dark" background, may be selectively enabled: coupling the $\phi_1$ waveform to all three segment electrodeportions, for a completely dark display, coupling the $\phi_1$ waveform to two of the electrodes with the third electrode receiving the $\phi_3$ waveform, for a total of three different indicia-indicating states; coupling the $\phi_1$ waveform to one of the three segment electrode portions with the remaining two being coupled to the $\phi_3$ driving waveform, for a total of three different indicia-indicating states; and coupling all three of the segment electrode portions to the $\phi_3$ waveform, whereby all three segments are in the "light" condition.

If switch means 25' couples the $\phi_2$ waveform (with a phase of 90° relative to the $\phi_1$ waveform) to control electrode 14 (FIG. 5b), then a phase difference exists between the $\phi_1$ waveform coupled to the background electrode portion 30a'', and between each of the three segment electrode portions 30b'', 30c'' and 30d'', regardless of whether the segment electrodes are selectively driven by the $\phi_1$ waveform or the $\phi_3$ waveform; accordingly, with a $\phi_2$ waveform driving the control electrode, the cell displays a "bright" background with all of the indicia-forming segments also being in the "bright" condition, but with a dark border underlying groove 32.

If switch means 25' couples the $\phi_3$ waveform to control electrode 14 (FIG. 5c), then a phase difference exists between the control electrode and the $\phi_1$ waveform driving background electrode portion 30a''', whereby the background is always in the light-transmissive, or "light", condition. The light-absorptive or light-transmissive condition of the electrode areas is, again, controlled by which of the waveforms is coupled to the individual segment electrode portion. If the $\phi_1$ waveform is coupled to an individual segment electrode portion, then that segment electrode portion is in the light-transmissive condition; if the $\phi_3$ wave-form is coupled to an individual segment electrode portion, then that segment electrode portion is in the light-absorptive condition. Thus, a total of eight ($2^N$) indicia-indicating states, each with a bright background, is selectively energizable when the control electrode is driven with the $\phi_3$ waveform: all electrode areas driven with the $\phi_1$ waveform, whereby all segment electrode portions are in the light-transmissive state; one of the segment electrode portions driven by the $\phi_1$ waveform and in the light-transmissive state, with the remaining two segment electrode portions driven by the $\phi_1$ waveform and in the light-absorptive state; two segment electrode portions driven by the $\phi_1$ waveform and in the light-transmissive state, with the remaining sector electrode portion driven by the $\phi_3$ waveform and in the light-absorptive state; and all three segment electrode portions driven by the $\phi_1$ waveform, whereby the segment electrode portions on the light-transmissive condition, with a bright background and a dark groove and duplicative of the condition illustrated in FIG. 5c, where the $\phi_2$ waveform is coupled to the control electrode. Thus, it is seen that a total of $2^{N+1}$ possible indicia-indicating states are achievable by driving the control electrode with either the $\phi_1$ waveform or its complement, the $\phi_3$ waveform, and by coupling a selected one of the complementary-phase waveforms to the background area of the remaining electrode, with the segment areas of the remaining electrode being selectively coupled to one of the two complementary-phase waveforms. However, in many applications, the phase of the waveform coupled to a particular segment electrode portion is fixed and the selection of the particular indicia to be displayed must be accomplished by switching the control electrode drive voltage between more than just the opposed-phase waveforms $\phi_1$ and $\phi_3$; the use of the $\phi_2$ waveform, having a phase substantially between the phases of the $\phi_1$ and $\phi_2$ waveforms (and the use of an open circuit to the control electrode) allows additional indicia-indicating states to be achieved. It should be understood that additional phases may be utilized, for either the control electrode or segment electrode portion driving waveforms, or for both sets of driving waveforms, to facilitate other combinations of light-transmissive and light-absorptive conditions; that waveforms with duty functions of ⅓ or less (nonoverlapping phases) can be used; and that the liquid crystal cell may be utilized, in a manner known to the art, with additional external elements, such as polarizers and the like, or internal elements, such as dichroic dyes dissolved in the host liquid crystal material, for achieving additional optical effects, colors and further multiplicities of indicia-indicative states with a single cell.

While the present invention has been described with reference to several presently preferred embodiments thereof, many variations and modifications will now become apparent to those skilled in the art. It is my intent, therefore, to be limited only by the scope of the appending claims, rather than by the specific embodiments disclosed herein.

What is claimed is:

1. A liquid crystal display, comprising:
   at least one liquid crystal cell, each cell including a continous control electrode;
   another electrode spaced from said control electrode and having an insulative groove formed therein to define N independent segment portions, where N is an integer greater than zero, each spatially and electrically separated from each other and from a remaining background portion;
   a layer of liquid crystal material filling the volume between said control electrode and said another electrode;
   sources of first and second driving voltages, each voltage having substantially identical frequencies, amplitudes and waveshapes, but having a phase, relative to an arbitrary reference, different from the phase of the other driving voltage;
   the first source being permanently connected to the background portion of said another electrode;
   first means for selectively connecting each of said N segment portions of said another electrode individually to one or the other of the voltages from said first and second voltage sources; and
   second means for selecting connecting each one of said first and second voltage sources individually to said control electrode;
   the connection of driving voltages of substantially identical phase, both to said control electrode and to at least one of said background portion and one of said N segment portions of said another electrode, causing the liquid crystal material therebetween to be in a first condition of light transmission;
   the area defined by said groove always being in said first light-transmissive condition;
   the connection of driving voltages having different phases, between said control electrode and at least one of said background portion and one of said N segment portions of said another electrode, causing the liquid crystal material therebetween to be in a remaining condition of light transmission;
   the voltage applied by said first selective connecting means to said control electrode selectively operating said cell with a selectable one of dark and bright background in the area defined by of said background electrode portion, and the voltage applied by said second selective connecting means to each of said segment electrode portions selectively operating said cell with a selectable one of dark and bright segments in the area defined by the associated segment electrode portion, to cause the cell to display a selected one of a total of $2^{N+1}$ different indicia.

2. The display as set forth in claim 1 wherein said first and second driving voltages are of substantially opposite phases.

3. The display as set forth in claim 2, wherein said first and second voltages are squarewaves.

4. The display as set forth in claim 3, wherein the squarewaves are unipolar.

5. The display as set forth in claim 2, further comprising a source of a third driving voltage, having identical amplitude, frequency and waveshape as the voltages from said first and second sources, but having a phase different from the phases thereof; and said second selective connecting means is adapted to selectively connect each one of said first, second and third voltage sources to said control electrode.

6. The display as set forth in claim 5, wherein the phase of the waveform supplied by said third source is substantially midway between the phases of the waveforms supplied by said first and second sources.

7. The display as set forth in claim 6, wherein the first, second and third voltages are squarewaves.

8. The display as set forth in claim 7, wherein the squarewaves are unipolar.

9. The display of claim 1, wherein said electrode includes a single segment portion, and said first selective connecting means permanently connects said single segment electrode portion to said second souce; and further comprising a source of a third driving voltage, having identical amplitude, frequency and waveshape as the voltages from said first and second sources, but having a phase different from the phases thereof; and said second selective connecting means selectively connects one of said first, second and third voltage sources or an open-circuit to said control electrode.

* * * * *